United States Patent Office 3,354,118
Patented Nov. 21, 1967

3,354,118
STABILIZATION OF POLYOLEFINS
Otto Mauz and Eberhard Prinz, Frankfurt am Main, Germany, assignors to Hercules Incorporated, a corporation of Delaware
No Drawing. Filed Aug. 24, 1964, Ser. No. 391,748
Claims priority, application Germany, Aug. 30, 1963, F 40,633
5 Claims. (Cl. 260—45.85)

ABSTRACT OF THE DISCLOSURE

Polyolefins are stabilized by the addition of a two-component stabilizer comprising (1) an ester of a bisphenol alkanoic acid with a mono- or polyhydric alcohol and (2) a trihydrocarbon phosphite.

The present invention relates to a stabilized polyolefin composition. A number of compounds and classes of compounds are known for the stabilization of plastics against accelerated aging caused by oxygen, particularly at higher temperatures or in the presence of light. Thus phenol derivatives, aromatic amines, substituted aminophenols and aliphatic or aromatic organic sulfides have been found useful for the improvement of aging stability of polyolefins.

The effectiveness of some stabilizers can be considerably increased by simultaneous addition of representatives of other classes of stabilizers. Such "synergistic" systems are distinguished by the fact that their activity in most cases greatly exceeds the sum of the activities of the individual stabilizer components. Although in the course of time a great number of synergistic mixtures have become known, it still cannot be predicted in advance whether any given stabilizer mixture will exhibit synergism.

It is known from French Patent 1,306,942 that the esters of bisphenolalkanoic acid are more effective antioxidants for polyolefins than are most phenolic stabilizers. However, these compounds are disadvantageous in that they show a tendency toward discoloration at high temperatures, especially in the presence of oxygen. Therefore, up to now their use in light-colored mixtures has been restricted to relatively low concentrations.

In accordance with the present invention, it has been found that polyolefins can be stabilized very effectively against oxidation by the addition of 0.05 to 5% by weight, based on the polyolefin, of a mixture of two components A and B in the weight ratio of 1:5 to 2:1, component A being a bisphenolalkanoic acid derivative of the general Formula 1

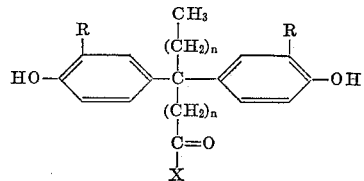

or 2

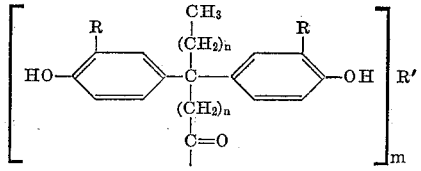

in which R is hydrogen, an aliphatic hydrocarbon radical with 1 to 18 carbon atoms or halogen, $n$ is an integer from 0 to 8, X is an alkoxy group having 1 to 18 carbon atoms, a radical formed by displacement of the hydrogen atom from one hydroxyl group of a 2 to 18 carbon atom normal or branched polyhydric alcohol, or an amino group selected from unsubstituted, partially substituted, or completely substituted amino groups; R' in Formula 2 is a multivalent organic radical obtained by the replacement of 2 to 6 hydroxyl hydrogen atoms from a 2 to 18 carbon atom polyhydric alcohol having 2 to 6 hydroxyl groups which may also contain one or more free OH-groups; and $m$ is an integer from 2 to 6, whose value is equal to the valence of R'; and component B being an organic phosphite of the general formula

in which $R_1$, $R_2$ and $R_3$ represent independently of each other alkyl radicals with 8 to 18 carbon atoms, aryl radicals, aralkyl radicals or alkaryl radicals, optionally mixed with other stabilizers customary for polyolefins.

It has surprisingly been found that by adding the phosphites not only is the tendency of the esters of bisphenolalkanoic acid to discolor at higher temperatures reduced, but at the same time the stabilizing action of the mixture is considerably greater, even though the phosphites alone show no stabilizing action in the polyolefins. From this, it can be seen that the mixture is acting synergistically. Such synergism does not occur between, e.g. phosphites and 2,2-isopropylidene-bis-p-nonylphenol, since, as the comparative examples in the table below show, when 2,2-isopropylidene-bis-p-nonylphenol is used as antioxidant, only a slight increase of the time to embrittlement at 140° C. is obtained upon combination of phosphites therewith.

In the preceding Formulae 1 and 2 the aliphatic radical R may be e.g. the methyl, ethyl, propyl, t-butyl, isooctyl, isononyl, n- or isododecyl, or n-octadecyl group, or a halogen, preferably chlorine or bromine. X in Formula 1 may be an alkoxy group, such as the methoxy, ethoxy, propoxy, butoxy, t-butoxy, pentoxy, octoxy, dodecyloxy, or octadecyloxy group, a hydroxyl substituted alkoxy group such as glycolyl, 3-hydroxypropoxy, trihydroxyneopentoxy or the like group, or an amino group whose hydrogen atoms may be substituted partially or completely by e.g. methyl, ethyl, propyl, butyl, dodecyl, or octadecyl radicals. R' in Formula 2 represents preferably a divalent hydrocarbon radical, e.g. a methylene, ethylene, propylene, butylene, pentylene, hexylene, heptylene, octylene, nonylene, decylene, undecylene, dodecylene, tetradecylene, hexadecylene, or octadecylene radical. It can also be a multivalent hydrocarbon radical having a structure such as the following:

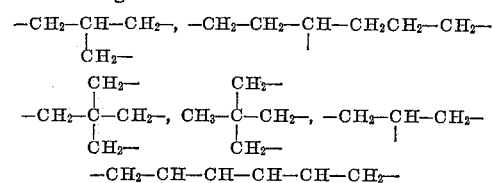

In the last mentioned radicals the free valences not occupied by bisphenolalkanoic acid radicals of Formula 2 may be occupied by free OH groups. Compounds of this kind are prepared by the partial or complete esterification of the bisphenolalkanoic acid with polyhydric alcohols, such as glycol, glycerine, 1,4-butanediol, 1,2,3-butanetriol, trimethylolpropane, hexanetriol, pentaerythritol, hexitol and the like. The esters formed which correspond to the general Formula 2, may also contain partially free OH groups originating from the polyhydric alcohols, since the esterification need not take place at all hydroxyl groups. The ester-like compounds prepared in this way have a higher molecular weight and consequently a lower volatility than the corresponding compounds of lower molecular weight and are more compatible with the polyolefins to be stabilized.

Especially preferred esters of bisphenolalkanoic acid corresponding to Formula 1 which can be used as components of the stabilizer mixture according to the invention, include the following: the dodecyl and octadecyl esters of 3,3-bis(4-hydroxyphenyl)-butyric acid, dodecyl and octadecyl esters of 3,3-bis(4-hydroxy-3-methylphenyl)-butyric acid, dodecyl and octadecyl esters of 4,4-bis-(4-hydroxyphenyl)-valeric acid, dodecyl ester of 3,3-bis-(4-hydroxy-3-chlorophenyl)-butyric acid, and octadecyl ester of 4,4-bis-(4-hydroxy-3-bromophenyl)-valeric acid. Examples of compounds which correspond to Formula 2 include compounds of the following structures:

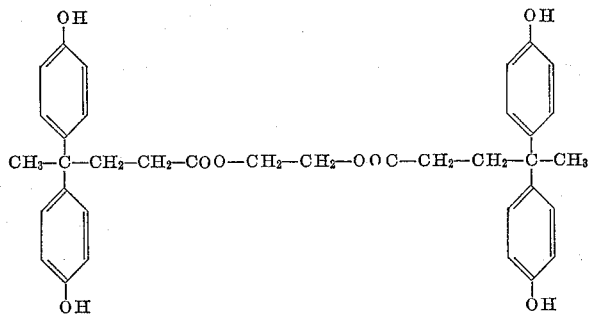

Ester of glycol and 4,4-bis-(4-hydroxyphenyl)-valeric acid.

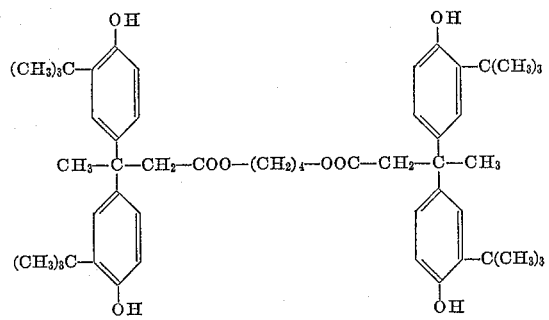

Ester of 3,3-bis(4-hydroxy-3-t-butylphenyl)-butyric acid and 1,4-butane diol.

The compounds of Formula 1 or of the free carboxylic acids corresponding to these compounds, can be prepared according to procedures known to the art by condensation of phenol or o-alkylphenols with keto-carboxylic acids or their esters in the presence of acid catalysts. Suitable phenols which can be used, for example, as starting products, include o-cresol-, 2-ethyl-, 2-propyl-, 2-isopropyl-, 2-t-butyl-, 2-isooctyl-, 2-isononyl-, 2-isododecyl-, 2-n-dodecyl-, 2-isooctadecyl-, and 2-n-octadecyl-phenol. Suitable keto-carboxylic acids, which, if necessary, are reacted in the form of their esters with the phenols, include pyroracemic acid, 3-keto-butyric acid, 4-keto-valeric acid, 5-keto-caproic acid, and acetoacetic acid (ester).

Suitable phosphites include: triphenyl phosphite, trioctyl phosphite, octyldiphenyl phosphite, tri-(nonylphenyl) phosphite, tridodecyl phosphite and the like.

The invention is especially suited for the stabilization of polyolefins containing tertiary carbon atoms. Preferable polyolefins of this kind are those which contain side chains due to the nature of the monomer, e.g. polypropylene and polybutene-1. High-pressure polyethylene and low-pressure polyethylene, which contain more or less side chains owing to secondary reactions, can also be stabilized in accordance with the invention. Stereoregular or isotactic polypropylene, which is the preferred compound to be stabilized according to the process of the invention, is prepared, as is low-pressure polyethylene, with the known Ziegler type low-pressure polymerization catalysts, which are described in Raff-Allison "Polyethylene" p. 72–81, and elsewhere.

The stabilizer combinations of this invention are particularly effective at temperatures just below the crystallite melting point of the polymer to be stabilized. Thus, the polyolefins stabilized according to the invention are particularly suitable for the preparation of molded articles, which are to be exposed to higher temperatures during their use. Furthermore, the processing stability of the polyolefins stabilized according to the invention is very good. The stabilizers can be mixed with the polyolefins at the same time or different times and the mixing is done best by means of a highly concentrated stabilizer-polyolefin masterbatch. For this purpose a concentrated solution of the stabilizers in a low-boiling solvent, e.g. acetone or methylene chloride, is mixed with a small amount of a powder of the polymer to be stabilized in such a ratio that after evaporation of the solvent, the mixture contains about 30–40% stabilizer by weight. This method of working furnishes a dry power, which can be incorporated in the usual way into the polymer to be stabilized, in order to obtain the desired concentration of stabilizer in the finished mass. It is, of course, also possible to incorporate the stabilizers during the preparation of the polymer or during its work up. This method of working has the added advantage that the polymer is protected very early, i.e., during the preparation or processing, against the influence of light and atmospheric oxygen. Polyolefins stabilized in this way can be treated by any of the known molding methods, e.g. compression, injection, and extrusion molding processes and the like.

*Examples*

One hundred parts of stereoregular polypropylene powder was mixed with 5% hydrocarbon solutions of the stabilizer combinations listed in the following table, in such a quantitative ratio that the stabilizer concentration based on the polypropylene amounted to five times the quantity of the concentration given in the table. After drying at 80° C. under vacuum, to remove the solvent, the stabilized polypropylene powder was mixed thoroughly with 400 parts of unstabilized polypropylene powder, after which the mixture was granulated in an extruder at 200° C. The sample granulate was then molded in an injection molding apparatus at 275° C. to form test platelets of 1 mm. thickness.

Several test strips, each 10 mm. wide and 100 mm. long were punched out of each injection molded plate and suspended in an oven with air circulation for the determination of the resistance to oxidation.

The oxidation resistance of the samples was determined by measuring the time to their embrittlement. The embrittlement time is the time in days, after which test strips, stored at 140° C. break upon bending 180° or show the beginning of a powdery decomposition. The aging test under heat conducted in a drying oven with air circulation is considerably more precise because of the constant air circulation and fresh air supply, than when conducted in a standard drying oven without air circulation. The embrittlement times thus found are summarized in the table.

For the determination of the color values and color fastness 2½ mm. color sample platelets were injection molded under the same conditions as above and their yellowing values were measured in a differential colorimeter before and after 7 days of storage in a drying oven with air circulation at 140° C.

TABLE

| Stabilizers | Concentration Percent by weight | Embrittlement Time at 140° C. in Days | Yellowing Value before/after 7 days storage at 140° C. | |
|---|---|---|---|---|
| 3,3-bis(4-hydroxy-3-methylphenyl)-butanoic acid dodecyl ester | 0.5 | } 38 | 7.5 | 44 |
| Plus octyldiphenyl phosphite | 0.5 | | | |
| 3,3-bis(4-hydroxy-3-methylphenyl)-butanoic acid dodecyl ester | 0.5 | } 35 | 13.2 | 76 |
| Plus triphenyl phosphite | 0.5 | | | |
| 3,3-bis(4-hydroxy-3-methylphenyl)-butanoic acid dodecyl ester | 0.5 | } 35 | 22.1 | 106 |
| Plus tridodecyl phosphite | 0.5 | | | |
| 4,4-bis(4-hydroxyphenyl)-pentanoic acid dodecyl ester | 0.5 | } 47 | 12.0 | 46 |
| Plus octyldiphenyl phosphite | 0.5 | | | |

Comparative Tests with the Individual Stabilizers

| Stabilizers | Concentration Percent by weight | Embrittlement Time at 140° C. in Days | Yellowing Value before/after 7 days storage at 140° C. | |
|---|---|---|---|---|
| 3,3-bis(4-hydroxy-3-methylphenyl)-butanoic acid dodecyl ester | 0.5 | 27 | 31.8 | 185 |
| 4,4-bis(4-hydroxyphenyl)-pentanoic acid dodecyl ester | 0.5 | 35 | 36.5 | 167 |
| Octyldiphenyl phosphite | 0.5 | <2 | | |
| Triphenyl phosphite | 0.5 | <2 | | |
| Tridodecyl phosphite | 0.5 | <2 | | |

Comparative Tests with 2,2-Isopropylidene-bis-p-nonylphenol
(Condensation Product of p-Nonylphenol and Acetone)
Alone and in Combination with a Phosphite

| Stabilizers | Concentration Percent by weight | Embrittlement Time at 140° C. in Days | Yellowing Value before/after 7 days storage at 140° C. | |
|---|---|---|---|---|
| 2,2-isopropylidene-bis-p-nonylphenol | 0.5 | 5-7 | | |
| 2,2-isopropylidene-bis-p-nonylphenol | 0.5 | } 8 | | |
| Plus octyldiphenyl phosphite | 0.5 | | | |

The synergistic action of the above-described stabilizer combination can be seen clearly from the values summarized in the table. The embrittlement time at 140° C. is considerably increased and the yellowing values are much better than with the use of bisphenol alkanoic acid esters alone. 2,2-isopropylidene-bis-p-nonylphenol, on the other hand, does not show this synergism.

What we claim and desire to protect by Letters Patent is:

1. A composition comprising a polymer of propylene and 0.05 to 5% based on the weight of the polymer of a two-component stabilizer consisting of components A and B in a weight ratio of 1:5 to 2:1; said component A being a bisphenol alkanoic acid derivative selected from the class consisting of compounds having the structural formula

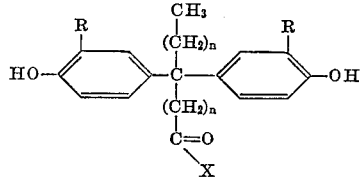

and compounds having the general formula

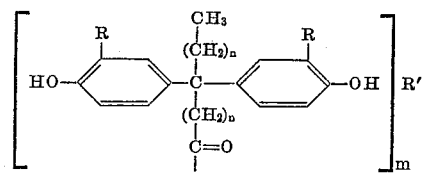

where R is selected from the class consisting of hydrogen, aliphatic radicals having 1 to 18 carbon atoms and halogen; $n$ is an integer from 0 to 8; X is selected from the class consisting of 1 to 18 carbon atom alkoxy radicals and 2 to 18 carbon atom alkoxy radicals having 1 to 5 free hydroxyl groups, and R' is a multivalent hydrocarbon radical obtained by displacement of 2 to 6 hydroxyl hydrogen atoms from a 2 to 18 carbon atom polyhydric alcohol having 2 to 6 hydroxyl groups and $m$ is an integer from 2 to 6 whose value is equal to the valence of R' and said component B being an organic phosphite of the general formula

where $R_1$, $R_2$, and $R_3$ are monovalent hydrocarbon radicals independent of one another selected from the class consisting of 8 to 18 carbon alkyl, aryl, alkaryl, and aralkyl radicals.

2. The composition of claim 1 where the stabilizing additive is a mixture of the dodecyl ester of 3,3-bis(4-hydroxy-3-methylphenyl)-butyric acid and octyldiphenyl phosphite.

3. The composition of claim 2 where the polyolefin to be stabilized is stereoregular polypropylene.

4. The composition of claim 1 where the stabilizing additive is a mixture of the dodecyl ester of 4,4-bis-(4-hydroxyphenyl) valeric acid and octyldiphenyl phosphite.

5. The composition of claim 4 where the polyolefin to be stabilized is polypropylene.

References Cited

UNITED STATES PATENTS 3,255,151   6/1966   Hecker et al. _____ 260—45.7

DONALD E. CZAJA, *Primary Examiner.*

V. P. HOKE, *Assistant Examiner.*